United States Patent Office 3,419,507
Patented Dec. 31, 1968

3,419,507
HOT-PRESS WATER-RESISTANT AMINO ALCOHOL ESTER INTERPOLYMER LATEX-BASED ADHESIVE FOR VARIOUS SUBSTRATES
Frederick Le Roy Brown, Midland, Mich., assignor to The Dow Chemical Company, Midland, Mich., a corporation of Delaware
No Drawing. Continuation-in-part of application Ser. No. 140,238, Sept. 25, 1961. This application July 15, 1965, Ser. No. 472,305
11 Claims. (Cl. 260—8)

ABSTRACT OF THE DISCLOSURE

This application is concerned with adhesive compositions consisting essentially of a mixture of a water-dispersible, finely divided proteinaceous or carbohydrate filler and a cationic latex composed of an amino alcohol ester of an unsaturated carboxylic acid and at least one interpolymerizable comonomer.

---

This application is a continuation-in-part of U.S. Ser. No. 140,238, filed Sept. 25, 1961, and now abandoned.

This invention relates to the provision of useful adhesive compositions. More particularly, it relates to such compositions as are characterized as possessing exceptional adhesive strength, high binding capacity, outstanding water-resistance and heat-resistance and which are employed advantageously for joining, binding or laminating substrata of various natural and synthetic materials. These substrata in various forms include organic thermoplastic and natural fibrous materials especially wood and wood products including sheets, boards and the like as well as chips, fibers and other particulate forms thereof that utilize a lignocellulosic or cellulosic fiber.

Latex-based adhesives known to the art exhibit fairly effective dry bond strengths. To date, however, latex binding compositions employed in joining or laminating various types of substrata such as wood have, for the most part, demonstrated a disadvantageous lack of water-resistance and heat-resistance. Thus, it is a common occurrence for plywood, laminated articles and laminated products composed of wood with other substrata that are bonded with those latex adhesives to delaminate when immersed in boiling water for a relatively short period of time.

An additional disadvantage of currently available latex bonding adhesives is the ineffectively low viscosity of the latexes that are employed as the principal binding ingredient in those adhesives. The lack of adequate body or viscosity characteristics attendant those latexes does not supply beneficial "gap-filling" properties, a requisite of effective binders for most plywood applications due to the generally rough surfaces of the wood veneer employed therein requiring the application of increased quantities of those adhesive compositions.

Accordingly, it is an object of the present invention to provide improved aqueous latex-based adhesive compositions that have the inherent beneficial characteristic of being thixotropic, a property which eliminates excessive penetration of the adhesive composition into the substrata upon which it is applied.

Another object of the present invention is to provide aqueous latex-based binding compositions that can be hot pressed to form water-resistant and heat-resistant glue lines.

A further object of the present invention is to provide aqueous latex-based adhesive compositions that may include varying amounts of proteinaceous fillers to effect decreased cost over that of the latex alone and, in some respects, over that of conventional adhesives used to obtain similar heat and water resistance and, in the same manner, permit the provision of a much more economical glue line for any degree of water resistance.

An additional object of the present invention is to provide aqueous latex-based adhesive compositions that demonstrate good spreadability characteristics.

A resulting object of the present invention is the provision of high-quality water-resistant and heat-resistant products containing some form of substratum that utilizes a lignocellulosic or cellulosic fiber as at least one of the substrata materials and which are joined, bonded or laminated by means of the aqueous latex-based adhesive compositions of the instant invention.

In accordance with the above-stated advantages and objects, improved latex adhesive compositions particularly suitably adapted for utilization as binding compositions (e.g., gluing, joining and laminating) for various substrata (including metals, organic thermoplastics and natural and synthetic fibrous materials, particularly wood and wooden products that are substantially composed of lignocellulosic or cellulosic fibers) to the surfaces of materials of a similar nature or as adhesives for binding one or more exterior faces of wood and with adjacent matching surfaces of materials of a different nature, such as structural metals, metal foils, organic thermoplastic sheeting, boards of foamed organic thermoplastic compositions and the like. These useful adhesive compositions are comprised of an essentially homogeneous mixture of (1) certain water-soluble or water-dispersible finely divided proteinaceous or carbohydrate fillers as will be described and (2) latexes of interpolymers composed of at least one polymerizable, ethylenically unsaturated compound (other than an amino compound) with a water-soluble salt of a polymerizable amino compound such as an amino alcohol ester of an unsaturated carboxylic acid as defined below. A normally advantageous range of latex solids to filler solids is shown in ratios of from about 100 percent by weight of latex solids for from about 20 to about 100 percent by weight of filler solids.

The finely divided filler materials employed in the adhesive compositions of the present invention include water-soluble or water-dispersible proteinaceous and carbohydrate materials and mixtures or blends thereof. These are filler materials which contain sites which are potentially reactive with unsaturated acids to form ester-type linkages or which may become chemically combined in other ways with the unsaturated acids. The outstanding advantage of moisture resistance is obtained when materials proteinaceous in nature are employed. Notably satisfactory results are attained when the filler material employed is a finely divided soybean flour containing a protein content of about 55 weight percent. Notwithstanding the beneficial results obtained with soybean flour, a sizable group of other proteinaceous fillers may also be employed successfully. Included in this group are sodium caseinate, soluble blood, unbleached wheat flour, a blend of soybean flour and blood (i.e., "Casco S-280"), casein, soybean α-protein, gluten, zein, walnut shell flour, lignocellulose flour having a particle size such that about 36 percent of the flour particles are capable of passing through a 35 mesh screening of the U.S. Standard Sieve Series (i.e., "Furafil M"), lignocellulose flour having a particle size capable of about a 99 percent passage through a U.S. Standard 100 mesh sieve, (i.e., "Furafil 100S") and the like known protein products. Exemplary of the filler materials of a carbohydrate nature are corn starch, black strap molasses, dextran, cationic starch and the like.

The interpolymer latexes, which are shown to be superior in their effectiveness as binding components of the instant adhesive compositions, are latexes prepared by means of known processes of emulsion polymerization. That is, latexes can be prepared using one or more of practically any water-insoluble ethylenically unsaturated monomer or a mixture thereof. However, at the start of the polymerization, a physical mixture of water-insoluble ethylenically unsaturated monomers or both nonionic and water-insoluble monomers are present and an aqueous solution of catalyst.

The amino alcohol esters of unsaturated carboxylic acids whose salts are polymerically combined in the cationic interpolymer latexes employed as the binding constituent of the adhesive compositions of the present invention are representable by the formula:

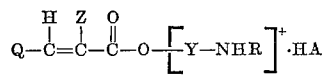

wherein "—Y—NHR" is the residue of an aliphatic amino monohydric alcohol containing from 2 to 6 carbon atoms and having the ester linkage attached to a different carbon atom than the amino group, Y is an alkylene radical containing from 2 to 6 carbon atoms, R is hydrogen or a hydrocarbon radical attached to nitrogen by a primary carbon atom, Q is selected from the group consisting of [—Y—NHR]$^+$·HA wherein —Y— and —R— have the same values as defined above, hydrogen and —COOH, Z is hydrogen, an alkyl radical, bromine and chlorine when Q is hydrogen and Z is hydrogen when Q is

and —COOH and A is HCl, HBr, $H_2SO_4$ or

Amino alcohol esters of α-methylene carboxylic acids and amino alcohols in which the amino group has at least one hydrogen atom (i.e., a primary or secondary amino group), which amino group is not sterically hindered and is separated from the ester linkage by from 2 to 3 carbon atoms in an alkylene radical, are described in a previously copending and now abandoned application Ser. No. 691,-134, filed Oct. 21, 1957 by Walter J. LeFevre and David P. Sheetz. Such esters are obtainable in accordance with that application in the form of hydrohalide salts by interaction of an α-methylene carboxylic acid halide and the hydrohalide salt of an amino aliphatic alcohol.

Specific examples of α-methylene carboxylic acids whose esters are employed in the preparation of the adhesive compositions of this invention are acrylic acid, methacrylic acid, α-ethylacrylic acid, α-propylacrylic acid, α-butylacrylic acid, α-pentylacrylic acid, α-hexylacrylic acid, atropic acid, α-cyclohexylacrylic acid, α-furylacrylic acid and α-chloroacrylic acid.

The unsaturated dicarboxylic acids whose amino esters are also contemplated in the practice of this invention are maleic acid, fumaric acid, itaconic acid and the like. Such esters are obtainable in the form of hydrohalide salts in a similar manner by interaction of an unsaturated dicarboxylic acid halide and the hydro-halide salt of an amino aliphatic alcohol.

Specific examples of amino alcohols whose esters are contemplated in the practice of this invention are 2-aminoethanol, 3-aminopropanol, 1-amino-2-propanol, 2-amino-2-methylpropanol, 2-aminobutanol, 3-aminobutanol, 3-amino-2-butanol, 3-amino-3-methyl-2-butanol, 2-methylaminoethanol, 2-ethylaminoethanol, 3-methylaminopropanol, 3-ethylaminopropanol, 1-methylamino-2-propanol, 1-ethylamino-2-propanol, 3-methylaminobutanol, 3-ethylaminobutanol, 3-methylamino-2-butanol, 3-ethylamino-2-butanol, 2-(2-aminoethylamino)ethanol, 2-aminocyclohexanol, 2 - methylaminocyclohexanol, 2-benzylaminoethanol and α-aminomethylbenzyl alcohol.

The terms "amino alcohol ester" and "amino alcohol ester of α-methylene carboxylic acid" as employed herein designate esters of unsaturated monocarboxylic acids and amino monohydric alcohols and esters of unsaturated dicarboxylic acids and amino monohydric alcohols according to the foregoing description.

Illustration of kinds of amino alcohol esters of α-methylene carboxylic acids whose stable salts are interpolymerized with polymerizable ethylenically unsaturated compounds, which interpolymers are employed in the adhesive composition of this invention are provided by the following specific examples: 2 - aminoethylacrylate, 2-aminoethyl 2-ethylacrylate, 2-aminoethyl, 2-propylacrylate, 2-aminoethyl 2-butylacrylate, 2-aminoethyl 2-pentylacrylate, 2-aminoethyl 2-hexylacrylate, 2-aminoethyl 2-cyclohexylacrylate, 2 - aminoethyl 2 - furylacrylate, 2-aminoethyl 2 - chloroacrylate, 3 - aminopropylacrylate, 1-amino-2-propylacrylate, 2 - amino - 2 - methylpropyl acrylate, 2 - aminobutyl acrylate, 3 - amino - 2 - butyl acrylate, 2 - methylaminoethylacrylate and 2-ethylaminoethyl acrylate.

Specific examples of the kinds of amino alcohol esters of unsaturated dicarboxylic acids whose stable salts are interpolymerized in the cationic interpolymers used in the adhesive compositions of the present invention are bis-2-aminoethylmaleate, bis-2-aminoethyl-2-ethylmaleate, bis-3-aminopropylmaleate, bis-1-amino-2-propylmaleate, bis-2-amino-2 - methylpropylmaleate, bis - 2 -aminobutylmaleate, bis - 3-amino-2-butylmaleate, bis-2-methylaminoethylmaleate, bis - 2 - ethylaminoethylmaleate, as well as fumarates, itaconates and the like dicarboxylic acids and esters having the same substituent groups.

In the practice of this invention, the amino alcohol esters of α-methylene carboxylic acids are employed in the form of their water-soluble salts, preferably salts of the hydrogen halides, such as hydrochloric acid and hydrobromic acid, and salts of acids such as sulfuric acid and toluene-sulfonic acid.

There are many known polymerizable, ethylenically unsaturated compounds that can be polymerized while dispersed in aqueous media by means already known per se to produce aqueous colloidal dispersions of substantially water-insoluble solid polymer products. These are advantageously polymerized in aqueous dispersions that comprise one of the amino alcohol esters of the class defined above in accordance with this invention.

Among such other known polymerizable ethylenically unsaturated compounds are the alkenyl aromatic compounds, i.e., the styrene compounds, the derivatives of ethylenically unsaturated acids such as the acrylic esters and unsaturated alcohol esters, unsaturated ethers and other compounds containing one or more ethylenic linkages capable of addition polymerization. Specific examples of such ethylenically unsaturated compounds are styrene, vinyl toluene, α - methylstyrene, ar - methylstyrene, ar-ethylstyrene, α,ar - dimethylstyrene, ar,ar - dimethylstyrene, n - butylstyrene, t - butylstyrene, n - propylstyrene, vinylnaphthalene, hydroxystyrene, methoxystyrene, cyanostyrene, acetylstyrene, monochlorostyrene, dichlorostyrene and other halostyrenes, divinylbenzene, methyl methacrylate, ethyl acrylate, butyl acrylate, hexyl acrylate, lauryl methacrylate, phenyl acrylate, α-chloroacrylate, vinyl ethyl ether, 1,3-butadiene, isoprene and the like.

As representative of the cationic interpolymer latexes which are prepared by emulsion interpolymerizing of the above-indicated amino alcohol esters of α-methylene carboxylic acids or amino alcohol esters of unsaturated dicarboxylic acids with polymerizable ethylenically unsaturated compounds are latexes composed of interpolymerized styrene and cationic monomers, such as 2-aminoethyl acrylate hydrochloride, 2-aminoethyl methacrylate hydrochloride, 2 - ethylaminoethyl methacrylate hydrochloride, or 2-aminoethyl acid maleate hydrochloride, an interpolymer of methyl methacrylate/n-butyl acrylate/2-aminoethyl methacrylate hydrochloride, an interpolymer of styrene/1,3-butadiene/2-aminoethyl methacrylate hydrochloride, an interpolymer of styrene/n - butylacrylate/2-aminoethyl methacrylate hydrochloride, an interpolymer of tert.-butylstyrene/2-aminoethyl methacrylate hydrochloride and the like.

The process for preparing the cationic interpolymers so advantageously combined in the adhesive compositions of the present invention comprises preparing an aqueous composition comprising a nonalkaline, e.g., neutral to acidic, aqueous medium, one or more of the class of water-soluble salts of amino alcohol esters of α-methylene carboxylic acids or one or more of the class of water-insoluble salts of amino alcohol esters of unsaturated dicarboxylic acids, and one or more of the class of other polymerizable ethylenically unsaturated compounds that are capable of forming substantially water-insoluble addition polymers.

The aqueous latex composition may optionally contain conventional emulsifiers, wetting agents, surfactants, and the like, although such constituents can be omitted from the starting compositions and, if used, can usually be employed in smaller proportions than is possible with other known processes.

The polymerization process employed also contemplates that the aqueous starting composition comprising the polymerizable material may contain polymerization catalysts of kinds already known to promote emulsion polymerizations. Among such catalysts are water-soluble oxidizing agents such as hydrogen peroxide and potassium persulfate and well-known redox catalysts. A particularly desirable catalyst system comprises hydrogen peroxide and ferric ions in an aqueous medium having a pH value not greater than 3. The starting composition may include acids or salts to provide a desired pH value and possibly a buffered system.

The advantages of the present invention are attained when the starting aqueous composition comprises from about 0.1 to 10, preferably, from 0.5 to 5 percent by weight of an amino alcohol ester of an α-methylene carboxylic acid per 100 parts by weight of the other polymerizable ethylenically unsaturated constituents of the composition. The other constituents of the starting compositions can be employed in usual proportions already known in this art. For example, the starting aqueous composition usually contains from 5 to 60 percent by weight of the polymerizable constituents and correspondingly from 95 to 40 percent by weight of the aqueous medium, although proportions outside of these ranges can be used.

The starting composition as described above is subjected to conditions conducive to polymerization of the polymerizable constituents. In most instances the starting composition is agitated and the temperature is raised, e.g., to a temperature in the range of from 40° C. to 100° C. to activate the polymerization, although in some instances, particularly those wherein the composition comprises a very active polymerization catalyst, the polymerization can occur at or below room temperature. Other means, such as exposure of the composition to activating radiations, can be employed to promote polymerization of the polymerizable constituents.

The preparation of the cationic interpolymers employed in the adhesive compositions of the present invention contemplate embodiments in which all of the constituents are charged to the starting mixture, and are polymerized therein in a single step, as well as embodiments in which the constituents are charged in a sequence, perhaps coordinated with a polymerization sequence, and/or the polymerization is carried out in a plurality of stages. The amino alcohol ester can advantageously be added to the polymerization reaction mixture prior to the polymerization step or at any time prior to the complete polymerization of the polymerizable constituents.

When the compositions comprising a salt of an amino alcohol ester of an α-methylene carboxylic acid or a salt of an amino alcohol ester of an unsaturated dicarboxylic acid and a different polymerizable ethylenically unsaturated compound dispersed in an aqueous medium are polymerized in accordance with this invention, there are obtained aqueous colloidal dispersions of polymeric products, commonly called synthetic polymer latexes or simply latexes, which contain the starting amino alcohol ester and other ethylenically unsaturated compound in polymerically combined form.

It is essential that the adhesive composition of the present invention be in a form whereby it may be readily applied to the wood or other materials by conventional techniques. Conveniently, this may be achieved when the polymeric component is dispersed in a nonpolar liquid medium. The aqueous interpolymer latexes are a readily made dispersion of a polymer in extremely finely divided form so that homogeneous admixture of the same with a filler is readily achieved. For this reason, the aqueous, water-insoluble latexes of the previously defined interpolymers are highly satisfactory for making up the instant adhesive compositions. The fillers may be dissolved in or dispersed throughout the continuous phase of the interpolymer dispersion. It is only necessary that a substantially homogeneous admixture of filler and interpolymer be present for subsequent reaction.

The solids content of any such dispersion will vary according to individual preference, the equipment available, and the adhesive applying technique desired. When spray methods are used to coat individual fibers for making fiber board, it may be desirable to use very thin dispersions of low solids content. When doctoring the composition onto plywood veneers or the like, it may be desirable to employ paste-like masses of from about 20 to about 45 or more percent by weight of solids. The compositions may be employed in any proportion of solids commonly used with the conventional adhesive applying techniques without reduction in the beneficial results.

The finely divided filler may be employed in a wide range of proportions to suit equipment or process capabilities or limitations and to tailor the formulation to the equipment, process or use. Thus, desirable benefits of adhesiveness may be attained when there is used as little as about 5 percent of filler, based on the weight of latex solids. At the other extremity, it has been found that the indicated utility is retained when the formulation contains about 400 percent of filler based on the weight of latex solids. As a general rule, it may be stated that as the proportion of filler is increased with a given latex solid, there results a decrease in water resistance to the cured or set adhesive composition. However, it also follows that this water resistance is dependent to a significant extent on the cure temperature employed. As the proportion of filler is increased, it is necessary to employ a higher cure temperature to reach a given water resistance. The optimum water resistance and other properties will thus be capable of variation within wide limits.

Wood and the like composite products (i.e., metals and thermoplastics) that may be glued, joined or laminated with the advantageous latex adhesive compositions of the present invention (such as laminated plywood from sheets and veneers; panels, particle boards and the like from chips and other filler particles; paper-like products from short hardwood fibers or various natural and synthetic fibers or any desired mixtures of such fibrous materials, utilizing a ligno-cellulosic or cellulosic fiber) have suitable initial strength as composite structures, excellent cold soak wet strength and exceedingly good retention of their strength even after being subjected to boiling water for considerable periods. Conventional amounts of the adhesive composition of the instant invention may be utilized for joining or binding wood and the like in any particular application. In fact, it is one of the benefits of the instant invention that frequently less adhesive is necessary for binding the substrate materials than with the prior known adhesives. Composite structures of metal foil/wood, metal/wood, boards of foamed thermoplastic/wood, thermoplastic sheeting/wood and wood/wood products that have been prepared with the latex adhesive compositions of the present invention are at least commensurate, if not superior, in these regards to many of the usual adhesive materials, such as urea-formaldehyde compositions, that have heretofore been available and frequently employed for such purposes.

In preparing composite wood and other structures with the adhesive compositions of the present invention, the permanent desired joinder is effected under the influence of heat at an elevated curing temperature for the mixture of the filler and latex interpolymer binder for a sufficient period of time to permit it to be thoroughly cured in situ while in binding contact with the wood or other filler or article being joined or bonded. Advantageously, the latex adhesive compositions are joined and set to bind the composite structures under a compressive effect of an applied pressure on the wooden or equivalent structures or particles being joined during the curing of the adhesive composition.

The pressure that is utilized need only be sufficient to ensure an intimate contact between the bonding surfaces. Of course, relatively high pressures, such as may be developed by, under or with the assistance of platens, rams and other pressing apparatus may also be employed. Thus, the pressure that is effected to compact the material being joined during setting of the latex adhesive composition may be between about 15 or less and 200 or more pounds per square inch, depending upon whatever conditions may be best suited and the practice that may be most desirable or favored when manufacturing various composite articles and structures.

It is usually necessary to employ a temperature from a heat-exchanging means of at least about 250° F. in order to cure the latex adhesive composition.

The period of time that the curing heat is applied depends to a great extent, as will be appreciated by those skilled in the art, upon the configuration and particular constitution of the structures or substrata being joined or bound as well as upon the heating conditions that are utilized and the heat transferring or exchanging efficiencies that may be involved. In many instances, as will hereinafter be apparent, the use of curing times that are longer than the absolute minimum which may be necessary for good bonding may achieve a significant increase in the water resistance of the bond. Care should be taken in all instances to avoid such extremes of temperature alone or time and temperature combined that may cause either the laminated materials or the latex adhesive compositions to degrade, decompose, burn or char so as to change its essential physical properties.

The following examples illustrate the invention but are not to be construed as limiting its scope. In the examples, parts and percentages are by weight unless otherwise noted.

Example 1

Into a polymerization vessel was charged a mixture of about 98 milliliters of water, about 1.0 milliliter of 30 percent hydrogen peroxide, ferric nitrate corresponding to 0.2 milligram of iron, 0.7 gram of 2-aminoethyl methacrylate hydrochloride, about 100 grams of styrene and enough dilute hydrochloric acid to render the aqueous phase of the mixture acidic to a pH value of about 2.7. After the atmosphere in the vessel was replaced with nitrogen, the vessel was closed and heated with agitation at about 70° C. for about 6 hours. There was thereby obtained a very stable aqueous colloidal dispersion containing about 50 percent of polystyrene stabilized with a small amount of the hydrochloride of 2-aminoethyl methacrylate polymerically combined therewith.

The 2-aminoethyl methacrylate employed in this example was a portion of the product obtained by mixing about 1097 g. of methacryloyl chloride and about 975 g. of ethanolamine hydrochloride, heating that mixture in the temperature range from about 80° to 85° C. for about ¾ hour until the evolution of hydrogen chloride ceased, and recrystallizing the resulting reaction product from ethylene dichloride.

The interpolymer latex thus prepared was divided into 4 parts and adhesive compositions of varying formulations prepared from each. Composition A contained about 29.2 percent of interpolymer latex solids and about 5 percent of a finely divided soybean flour obtained as "Prosein." Composition B contained about 23.3 percent of latex solids and about 11.7 percent of the same soybean flour. Composition C contained about 17.5 percent of latex solids and about 17.5 percent of the same filler material. Composition D consisted of the interpolymer latex alone having about 48 percent solids. All of the formulations used water as the sole liquid dispersant.

Three-ply yellow birch panels were prepared from $\frac{1}{16}$ inch rotary cut veneer in a size of 7½ inches by 12 inches. The formulations were brushed onto the veneer and pressed for 5 minutes at 200 lbs./in.$^2$. The press temperatures used were room temperature, 200°, 250° and 300° F. The panels were cut into standard plywood strip-shear specimens for testing according to Commercial Standard CS35–56, Section 5.4.1, "Dry Shear Test," and Section 5.4.2, "Cyclic Boil Test." The results are recorded in Table I as follows.

A series of control panels was prepared employing two commercial adhesive binding materials per se plus the same two adhesive binders formulated with fillers as recommended by the manufacturers. These control panels (Compositions E, F, G and H) were prepared and tested to supply comparative data for the "latex-Prosein" bonds obtained with Compositions A, B, C and D. Composition E was a urea-formaldehyde resin dispersion having about 65 percent of resin solids and obtained as "Perkins L–100" and spread at about 19.3 pounds of resin solids per thousand square feet of single glue line. Composition F, containing the same urea-formaldehyde resin dispersion as Composition E, was formulated with about 100 percent of wheat flour filler based on resin solids and spread at an adhesive solids level of about 22.6 pounds of solids per thousand square feet of single glue line. Composition G was an unplasticized aqueous latex dispersion of copolymer composed of about 60 weight percent of styrene and about 40 weight percent of butadiene. Composition G, obtained as "Lytron 881," had a latex solids content of about 48.0 percent. Composition H was a formulated adhesive composition containing about 9.6 percent "Lytron 881" latex solids and about 28.5 percent of a blend of casein and soybean flours, obtained as "Lauxein 1900."

The details of preparing and testing the control panels generally duplicated the materials, molding conditions and test procedures employed in the cases of Compositions A, B, C and D, as set forth above. The test results on the control panels are also recorded in Table I.

TABLE I.—PLYWOOD STRENGTH DATA OBTAINED FROM PANELS MADE WITH FORMULATIONS OF LATEX WITH A CRUDE SOYBEAN FLOUR

[Latex: Polystyrene latex containing 2.0 per cent 2-aminoethyl methacrylate hydrochloride in the copolymer]

| Formulations | Adhesive Composition | | | Solid spread [1] | Press cycle [2] | Strength Data [3] | | | | | | | |
|---|---|---|---|---|---|---|---|---|---|---|---|---|---|
| | Latex solids, percent | Filler solids, percent | Total solids, percent | | | Dry | | 48 hr. soak | | 2 hr. boil | | Cyclic boil | |
| | | | | | | P.s.i. | Percent wood failure | P.s.i. | Percent wood failure | P.s.i. | Percent wood failure | P.s.i. | Percent wood failure |
| A | 29.2 | 5.8 | 35.0 | 7.6 | 200 | 236 | 5 | | D | | | | D |
| | | | | 8.0 | 250 | 392 | 5 | 33 | 0 | | | 162 | 0 |
| | | | | 7.0 | 300 | 506 | 72 | 167 | 0 | | | 200 | 5 |
| B | 23.3 | 11.7 | 35.0 | 10.4 | 200 | 438 | 6 | 43 | 0 | 92 | 0 | 161 | 0 |
| | | | | 10.7 | 250 | 491 | 35 | 148 | 0 | 220 | 0 | 193 | 0 |
| | | | | 9.5 | 300 | 562 | 60 | 267 | 0 | 253 | 0 | 211 | 0 |
| C | 17.5 | 17.5 | 35.0 | 10.8 | 200 | 248 | 15 | | D | | | 71 | 0 |
| | | | | 10.9 | 250 | 373 | 20 | 183 | 0 | | | 152 | 0 |
| | | | | 10.2 | 300 | 413 | 65 | 226 | 0 | | | 224 | 20 |
| D | 48.0 | 0.0 | 48.0 | 8.1 | 200 | 156 | 5 | | D | | | | D |
| | | | | 7.9 | 250 | 378 | 5 | 155 | 0 | | | 158 | 0 |
| | | | | 8.4 | 300 | 476 | 25 | 236 | 0 | | | 260 | 0 |
| Controls: | | | | | | | | | | | | | |
| E | [5] 65.0 | 0.0 | 65.0 | 19.3 | 250 | 671 | | 498 | | D | | D | |
| | 65.0 | 0.0 | 65.0 | 19.3 | 250 | 770 | | 512 | | D | | D | |
| F | [5] 28.5 | 28.5 | 57.0 | 22.6 | 250 | 688 | | 418 | | D | | D | |
| | | | | 22.6 | 250 | 584 | | 357 | | D | | D | |
| G | 48.0 | 0.0 | 48.0 | 10.5 | 200 | 338 | | D | | D | | | |
| | | | | 8.8 | 250 | ([4]) | | | | | | | |
| | | | | 9.7 | 300 | ([4]) | | | | | | | |
| H | 9.6 | 28.6 | 38.2 | 14.6 | 200 | 573 | | 91 | | D | | | |
| | | | | 11.1 | 250 | 652 | | 202 | | D | | | |
| | | | | 11.9 | 300 | 618 | | 239 | | D | | | |

[1] Spread expressed as pounds of solids per thousand square feet of single glue line.
[2] Temperature in degrees F. All panels pressed at 200 p.s.i.
[3] Strength of standard plywood strip-shear specimen. Data reported are strength in p.s.i. and wood failure in percent and are the average of four specimens obtained from two panels. D=delamination. Cyclic boil exposure was 4 hours in boiling water, 20 hours drying at 145° F., and 4 additional hours boiling.
[4] Panel delaminated on release of pressure.
[5] Urea-formaldehyde resin solids.

Example 2

An adhesive composition was prepared with a latex resulting from the emulsion polymerization of about 98 weight percent of styrene and about 2.0 weight percent of 2-aminoethyl methacrylate hydrochloride and about 20 weight percent as based on latex solids of a variety of proteinaceous and carbohydrate fillers or extenders. Three-ply 3/16 inch yellow birch panels were prepared as before and subjected to the strip-shear test and the cyclic boil test as described in Example 1. The test results are set forth in Table II.

Example 3

An adhesive composition was prepared with a latex having a solids content of about 50 percent resulting from the emulsion polymerization of about 98 weight percent of styrene and about 2.0 weight percent of 2-aminoethyl acid maleate hydrochloride and about 20 weight percent as based on latex solids of a finely divided soybean flour obtained as "Prosein." Three-ply 3/16 inch yellow birch panels were prepared according to procedures set forth in Example 1 employing the adhesive composition described above having a total solids content (latex+filler TABLE II.—RESULTS OBTAINED WITH VARIOUS MATERIALS USED AS THE "PROTEINACEOUS-CARBOHYDRATE" INGREDIENT OF THE COMPOSITION

[Ratio of latex solids to solids of the other ingredient was held constant at 1.0:0.2. Latex used was polystyrene containing 2.0 percent 2-aminoethyl methacrylate hydrochloride. All panels were pressed 5 minutes at 300° F. and 200 p.s.i.]

| Protein carbohydrate or mixture | Solid spread [1] | Strength Data [2] | | | |
|---|---|---|---|---|---|
| | | Dry | | Cyclic boil | |
| | | percent | percent | p.s.i. | percent |
| Casein | 11.8 | 552 | 50 | 272 | 0 |
| Sodium Caseinate | 11.9 | 545 | 95 | 244 | 45 |
| Soluble Blood | 11.6 | 744 | 70 | 444 | 50 |
| Wheat Flour (unbleached) | 11.5 | 615 | 55 | 294 | 0 |
| Soybean Flour | 11.7 | 612 | 90 | 304 | 55 |
| Soy-Blood Blend | 12.1 | 726 | 80 | 343 | 50 |
| Lignocellulose Flour ("Furafil M") [3] | 11.5 | 630 | 75 | 300 | 20 |
| Lignocellulose Flour ("Furafil 100 S") [3] | 11.8 | 622 | 45 | 309 | 35 |
| Soybean α-protein | 11.7 | 644 | 65 | 330 | 75 |
| Soybean Flour | 11.9 | 629 | 65 | 269 | 30 |
| Gluten | 11.7 | 714 | 70 | 134 | 10 |
| Walnut Shell Flour | 12.3 | 739 | 90 | 355 | 0 |
| Corn Starch | 11.5 | 651 | 90 | 219 | 0 |
| Black Strap Molasses | 12.5 | 656 | 75 | 365 | 65 |
| Dextran | 11.8 | 614 | 70 | 279 | 30 |
| Condensation Product of Ethylene Diamine and Formaldehyde | 12.5 | 556 | 80 | 225 | 15 |
| Cationic Starch | 12.0 | 637 | 65 | 336 | 5 |
| Zein | 12.1 | 684 | 10 | 264 | 0 |
| None (latex alone) | 11.9 | 550 | 45 | 242 | 0 |

[1] Spread expressed as pounds of solids per thousand square feet of single glue line.
[2] Strength of standard plywood strip-shear specimen. Data reported are strength in p.s.i. and wood failure in percent and are the average of 4 specimens obtained from two panels. Cyclic boil exposure was 4 hours in boiling water, 20 hours drying at 145° F., and 4 additional hours boiling.
[3] Filler principally comprised of modified cellulose, lignin and resins, and ash with to 3 percent acid as sulfuric, also containing about 2 percent caustic soda extractables.

solids) of about 30 percent. Also, test panels were prepared using as the binding agent the styrene/2-aminoethyl acid maleate hydrochloride latex per se at a solids level of about 50 percent. The adhesive composition and the aqueous latex binding agent were brushed onto individual veneer panels and both types of binders were cured at about 200 lbs./in.² for either 3 or 5 minutes at a press temperature of about 300° F. The panels were cut into standard plywood strip-shear specimens for testing according to Commercial Standard CS 35–56, section 5.4.1, "Dry Shear Test," and section 5.4.2, "Cyclic Boil Test." The test results are summarized in Table III below:

TABLE III

| Binder | Cure cycle | Strip-shear strength values | |
|---|---|---|---|
| | | Dry, p.s.i. | Cyclic boil, p.s.i. |
| Latex (30% solids) | 300° F., 3 min | 374 | 180 |
| Do | 300° F., 5 min | 401 | 291 |
| Adhesive Composition (30% solids) | 300° F., 3 min | 361 | 177 |
| Do | 300° F., 5 min | 375 | 201 |

Similar adhesive compositions to those of the above examples that are characterized as possessing exceptional adhesive strength, high binding capacity, outstanding water-resistance and heat-resistance can be prepared from cationic latexes of interpolymers containing polymerizable salts of other amino alcohol esters of unsaturated monocarboxylic and dicarboxylic acids and other polymerizable ethylenically unsaturated monomers within the scope of the present invention in combination with other suitable filler materials, as previously described also.

Changes and modifications can be made in the above-described details without departing from the nature and spirit of the invention. It is to be understood that the invention is not limited thereto except as set forth in the appended claims.

What is claimed is:

1. An adhesive composition consisting essentially of an essentially homogeneous mixture of (1) from 5 to 400 percent by weight based on the polymeric solids of latex of a water-dispersible finely divided proteinaceous or carbohydrate filler and (2) a cationic latex consisting essentially of an interpolymer composed of at least one interpolymerizable ethylenically unsaturated monomer and interpolymerized therewith an amino alcohol ester of an unsaturated carboxylic acid representable by the general formula:

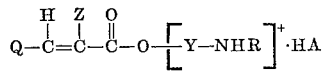

wherein "—Y—NHR" is the residue of an aliphatic amino monohydric alcohol containing from 2 to 6 carbon atoms and having the ester linkage attached to a different carbon atom than the amino group, the symbol "Y" represents an alkylene radical containing from 2 to 6 carbon atoms, "R" is hydrogen or a hydrocarbon radical attached to nitrogen by a primary carbon atom, "Q" is selected from the group consisting of [—Y—NHR]⁺·HA wherein —Y— and —R— have the same values as defined above, hydrogen and —COOH, "Z" is hydrogen, an alkyl radical, bromine and chlorine when "Q" is hydrogen and "Z" is hydrogen when "Q" is [—Y—NHR]⁺·HA and —COOH and "A" is HCl, HBr, $H_2SO_4$ or $CH_3C_6H_4SO_3H$.

2. The composition of claim 1 wherein said proteinaceous material is soybean flour.

3. The composition of claim 1 wherein said adhesive composition is a spreadable mass having a solids content of from about 20 to about 45 weight percent.

4. The composition of claim 1 wherein said latex is composed of an interpolymer of from 0.1 to 10 weight percent of an amino alcohol ester of an unsaturated carboxylic acid with any remainder of said interpolymer being of at least one polymerizable ethylenically unsaturated monomer.

5. The composition of claim 4 wherein said interpolymer is composed of an ethylenically unsaturated monomer and an amino alcohol ester of an unsaturated dicarboxylic acid.

6. The composition of claim 5 wherein said ethylenically unsaturated monomer is styrene and said amino alcohol ester is 2-aminoethyl acid maleate hydrochloride.

7. The composition of claim 4 wherein said interpolymer is composed of an ethylenically unsaturated monomer and an amino alcohol ester of an α-methylene carboxylic acid.

8. The composition of claim 7 wherein said ethylenically unsaturated monomer is styrene and said amino alcohol ester is 2-aminoethyl methacrylate hydrochloride.

9. An adhesive composition consisting essentially of a homogeneous mixture containing from about 20 to about 45 weight percent solids based on the total compositional weight of 100 percent and consisting essentially of from about 5 to about 400 weight percent solids of a finely divided water-dispersible proteinaceous material dispersed in about 100 weight percent of an aqueous latex of an interpolymer composed of styrene interpolymerized with from about 0.1 to about 10 weight percent of 2-aminoethyl methacrylate hydrochloride, said interpolymer having a solids content of from about 45 to about 55 weight percent as based on 100 weight percent of said aqueous latex.

10. The composition of claim 9 wherein said proteinaceous material is soybean flour.

11. The composition of claim 9 wherein said aqueous latex is an interpolymer composed of styrene interpolymerized with about 0.1 to about 10 weight percent of 2-aminoethyl acid maleate hydrochloride.

References Cited

UNITED STATES PATENTS 3,108,979  10/1963  Le Fevre et al. _____ 260—29.6
3,239,408  3/1966  Meyer et al. _____ 260—29.6

WILLIAM H. SHORT, Primary Examiner.

U.S. Cl. X.R.

260—17.4, 29.6